US008137183B2

(12) United States Patent
Kearns et al.

(10) Patent No.: US 8,137,183 B2
(45) Date of Patent: Mar. 20, 2012

(54) METHOD FOR ANIMATING MECHANICAL REELS ON A GAMING MACHINE

(75) Inventors: John K. Kearns, Henderson, NV (US); Benjamin Isaac, Las Vegas, NV (US)

(73) Assignee: Bally Gaming, Inc, Las Vegas, NV (US)

( * ) Notice: Subject to any disclaimer, the term of this patent is extended or adjusted under 35 U.S.C. 154(b) by 872 days.

(21) Appl. No.: 12/196,243

(22) Filed: Aug. 21, 2008

(65) Prior Publication Data

US 2010/0048281 A1 Feb. 25, 2010

(51) Int. Cl.
*A63F 9/24* (2006.01)
*A63F 13/00* (2006.01)

(52) U.S. Cl. ............................... 463/20; 463/30; 463/31

(58) Field of Classification Search ............. 463/30-34, 463/20

See application file for complete search history.

(56) References Cited

U.S. PATENT DOCUMENTS 4,711,452 A * 12/1987 Dickinson et al. ......... 273/143 R
5,580,055 A * 12/1996 Hagiwara ................. 273/143 R
6,027,115 A * 2/2000 Griswold et al. ......... 273/143 R
6,056,642 A * 5/2000 Bennett ........................... 463/20
6,206,781 B1 * 3/2001 Sunaga et al. .................. 463/20
6,383,073 B1 * 5/2002 Nagano ........................... 463/20
6,811,273 B2 * 11/2004 Satoh et al. ..................... 362/27
6,852,031 B1 * 2/2005 Rowe .............................. 463/29
7,232,127 B2 * 6/2007 Seelig et al. .............. 273/143 R
7,380,791 B2 * 6/2008 Gauselmann et al. ..... 273/142 B
7,452,276 B2 * 11/2008 Loose et al. .................... 463/31
7,465,226 B2 * 12/2008 Ikeya et al. ..................... 463/16
7,614,951 B2 * 11/2009 Flemming et al. .............. 463/20
7,654,899 B2 * 2/2010 Durham et al. ................. 463/30
7,972,206 B2 * 7/2011 Okada ............................. 463/16
8,016,669 B2 * 9/2011 Okada ............................. 463/30
2002/0123378 A1 * 9/2002 Bucknall et al. ................ 463/16
2003/0148804 A1 * 8/2003 Ikeya et al. ..................... 463/16
2004/0132522 A1 * 7/2004 Seelig et al. .................... 463/16
2004/0209682 A1 * 10/2004 Okada ............................. 463/31
2004/0259627 A1 * 12/2004 Walker et al. .................. 463/20
2005/0124407 A1 * 6/2005 Rowe .............................. 463/25
2005/0153768 A1 * 7/2005 Paulsen ........................... 463/16
2006/0211494 A1 * 9/2006 Helfer ............................. 463/30
2007/0026921 A1 * 2/2007 Fukui et al. ..................... 463/16
2007/0111788 A1 * 5/2007 Bucknall et al. ................ 463/30
2009/0143134 A1 * 6/2009 Anderson et al. ............... 463/20

* cited by examiner

*Primary Examiner* — Steven J Hylinski
(74) *Attorney, Agent, or Firm* — Steptoe & Johnson LLP

(57) ABSTRACT

A method for providing animation on a gaming machine having mechanical reels is disclosed. The method comprises spinning at least one mechanical reel, and illuminating a first symbol on the spinning mechanical reel, wherein the lighting system directs light onto the first symbol for a designated amount of time while the mechanical reel is spinning. A second symbol on the spinning reel is then illuminated, and combined effect of illuminating the first and second symbols while the mechanical reel is spinning is to produce the appearance of animation.

17 Claims, 7 Drawing Sheets

METHOD FOR ANIMATING MECHANICAL REELS ON A GAMING MACHINE

Embodiments disclosed herein relate generally to a method for providing an animation sequence on mechanical reels.

BACKGROUND

Gaming machines have been developed having various features to capture and maintain player interest. Traditionally, gaming machines garner player interest by providing the player with the opportunity to win cash awards based upon a player's wager. Accordingly, various types of games or game features have been developed to provide players with the opportunity to win large sums of money for a small wager. For example, games may include one or more bonus games or the opportunity to win progressive jackpots in order to maintain player interest.

Additionally, over the years, gaming machines have grown in sophistication and features to maintain player interest. For example, the mechanical reels of traditional gaming machines have been replaced with video depictions of spinning reels. These video gaming machines provide a richer gaming experience for players by including graphics or animation as part of the game. Nevertheless, mechanical gaming machines continue to be successful even though there are physical limitations as to the features that may be provided on a mechanical gaming machine. Accordingly, there is a continuing need for mechanical slot machine variants that provide a player with enhanced excitement without departing from the original slot machine gaming concept.

SUMMARY

Briefly, and in general terms, various embodiments are directed to methods for presenting animation on mechanical gaming machines.

One embodiment is directed to a method for providing animation on a gaming machine having one or more mechanical reels. At least one mechanical reel is spun, wherein the mechanical reel comprises one or more symbols around an outer circumference of the mechanical reel. An animation sequence is selected to present during the spinning of the mechanical reel, wherein the animation sequence comprises at least a first symbol and a second symbol. The first symbol of the animation sequence is illuminated by locating the first symbol on the spinning mechanical reel and directing light from a lighting system onto the first symbol for a designated amount of time while the mechanical reel is spinning. A second symbol in the animation sequence is illuminated by locating the second symbol on the spinning mechanical reel and directing light from the lighting system onto the second symbol for a designated amount of time while the mechanical reel is spinning. The combined effect of illuminating the first and second symbols while the mechanical reel is spinning is to produce the appearance of animation.

Another embodiment is directed to a method for providing animation on a network of gaming machines. The method comprises providing two or more gaming machines connected via a network connection. At least one mechanical reel on the first gaming machine is spun, wherein the mechanical reel comprises one or more symbols around an outer circumference of the mechanical reel. A first symbol located on the spinning mechanical reel of the first gaming machine is illuminated by a lighting system that directs light onto the first symbol for a designated amount of time while the mechanical reel is spinning. At least one mechanical reel on a second gaming machine is spun, wherein the mechanical reel comprises one or more symbols around an outer circumference of the mechanical reel. A second symbol located on the spinning mechanical reel of the second gaming machine is illuminated by a lighting system directing light onto the second symbol for a designated amount of time while the mechanical reel is spinning. The combined effect of illuminating the first and second symbols while the mechanical reels are spinning is to produce the appearance of animation.

Other features and advantages will become apparent from the following detailed description, taken in conjunction with the accompanying drawings, which illustrate by way of example, the features of the various embodiments.

DETAILED DESCRIPTION

Various embodiments disclosed herein are directed to providing animation on a mechanical or electro-mechanical reel gaming machine. In particular, spinning mechanical reels are used to simulate the appearance of animation in the display area of a gaming machine.

More particularly, as the mechanical reel is spinning and the symbol (also called an icon) passes in front of a display window, an illumination system first activates a light to illuminate the selected symbol on the spinning reel and then deactivates the light so that the symbol is no longer illuminated. The brief illumination of the symbols simulates the appearance of stopped motion for a small amount of time. As the next symbol in the reel strip animation sequence passes by, the illumination system again strobes a light. In other words, a light is again turned on and then off to briefly illuminate the next symbol, again giving the appearance of stopped motion. The combined effect of the multiple stopped motion effects gives the appearance of animation on a physical, mechanical reel.

Figure 1:
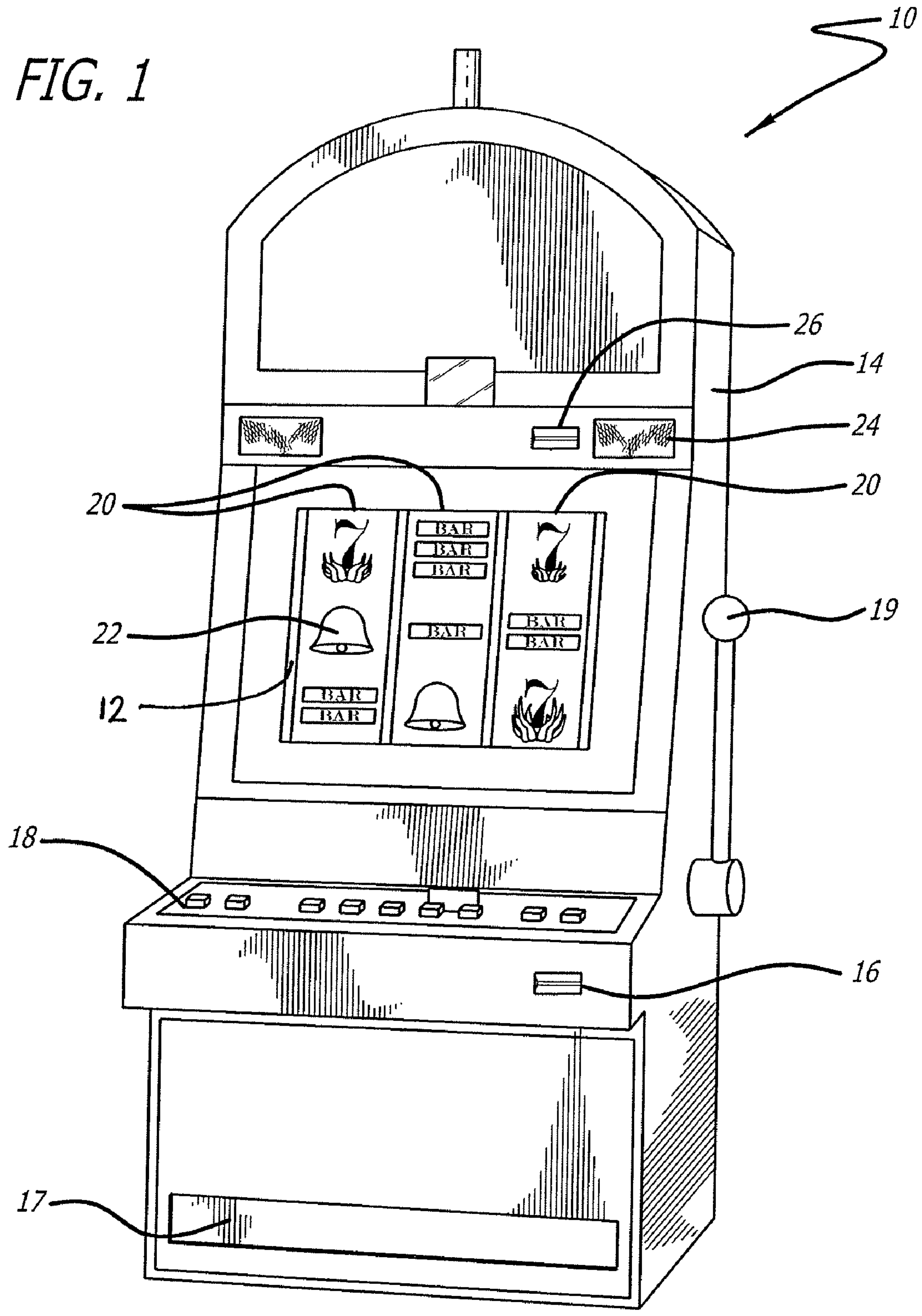
FIG. 1 is a perspective view of one embodiment of a mechanical gaming machine configured to produce an animation effect.

Referring now to the drawings, wherein like reference numerals denote like or corresponding parts throughout the drawings, and more particularly to FIGS. 1-8, there are shown various embodiments of a system and method for producing animation on a mechanical or electro mechanical gaming machine. Specifically, FIG. 1 illustrates a mechanical gaming machine 10. The gaming machine 10 includes three mechanical reels 20 that are visible through a display window 12. Those skilled in the art will appreciate that the gaming machine 10 may have any number of mechanical reels 20. Additionally, one or more symbols 22 are provided on the outer surface of each mechanical reel 12.

The mechanical reels 20 are housed in a gaming cabinet 14. The main cabinet 14 of the gaming machine 10 is a selfstanding unit that is generally rectangular in shape. In other embodiments, the cabinet (not shown) may be a slant-top, bar-top, or table-top style cabinet. However, any shaped cabinet may be used with any embodiment of the gaming machine 10 and sized for a player to be able to sit or stand while playing a game. Additionally, the cabinet 14 may be manufactured with reinforced steel or other rigid materials that are resistant to tampering and vandalism.

The gaming machine 10 includes one or more input mechanisms. In one embodiment, the gaming machine 10 may include a plurality of player-activated buttons 18, which may be used for numerous functions such as, but not limited to, selecting a wager denomination, selecting a number of games to be played, selecting a wager amount per game, initiating a game, or cashing out money from the gaming machine 10. The buttons 18 function as input mechanisms and may include mechanical buttons, electromechanical buttons or touch screen buttons. Optionally, handle 19 may also serve as an input mechanism. More particularly, the handle 19 may be "pulled" by a player to initiate a game.

The gaming machine 10 may also include one or more speakers 24. Various types of audio may be output to the speakers 24.

In various embodiments, the gaming machine 10 shown may also include a ticket reader/ticket printer system 16 that is associated with a cashless gaming system. In one embodiment, the ticket reader/ticket printer system may print out and/or issue tickets. In another embodiment, the ticket reader/ticket printer system 16 is capable of accepting previously printed vouchers, paper currency, promotional coupons, or the like. The ticket reader/ticket printer system 16 of the cashless gaming system may generate vouchers having printed information that includes, but is not limited to, the value of the voucher (i.e., cash-out amount) and a barcode that identifies the voucher.

Optionally, in an alternate embodiment, the ticket reader/ticket printer system 16 includes a bill acceptor, which is an assembly that examines currency or coupons and communicates the value to the machine. Accepted items register as credits, and rejected items are returned to the player. In one optional embodiment, the slot 24 works in conjunction with a bill acceptor assembly. Alternately, in an optional embodiment, the gaming machine 10 includes a separate bill acceptor (not shown). In one embodiment, the bill acceptor device may include an embedded web server that delivers a management user interface to a web browser. The management user interface may be used to control and configure various functions and operations of the bill acceptor.

The gaming machine 10 may further include a player tracking system (not shown). The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on the gaming machine 10. These input components include, but are not limited to, a card reader 26 for receiving a player tracking card, a keypad or equivalent, an electronic button receptor, a touch screen and the like. The player tracking system may also include a database of all qualified players (i.e., those players who have enrolled in a player rating or point accruing program). Generally, the database for the player tracking system is separate from the gaming devices.

The gaming machine 10 includes a card reader 26 that may be used to read player tracking cards. Additionally, the card reader 26 may also read casino employee cards. Each time a card is inserted into the reader, it monitors and tracks player and employee activity.

Figure 2:
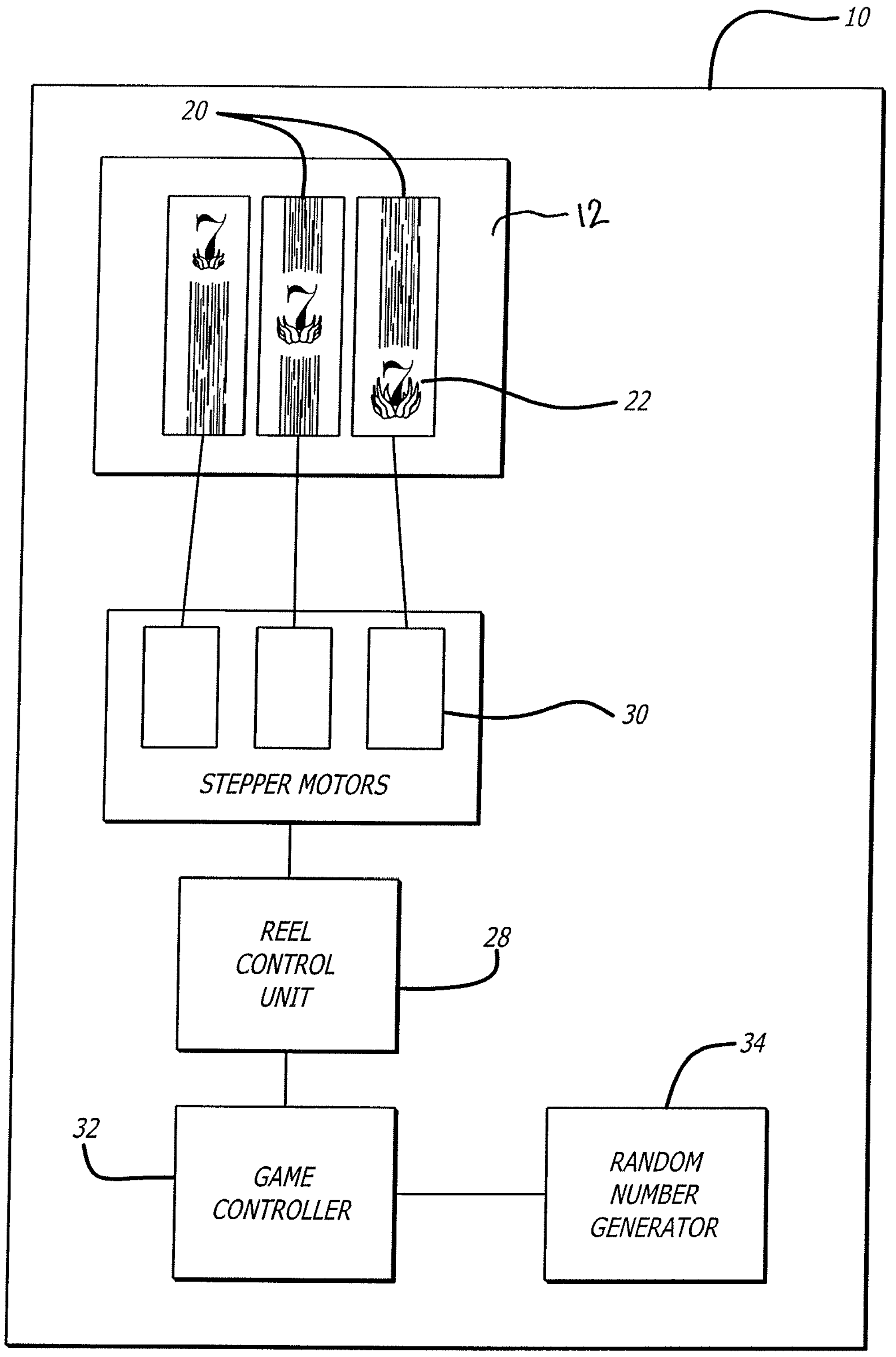
FIG. 2 is a schematic diagram of one embodiment of a mechanical gaming machine.

FIG. 2 is a schematic illustration of a gaming machine 10 configured to provide animation sequences on the mechanical gaming machine 10. The mechanical gaming machine 10 includes stepper motors 30, wherein one stepper motor is connected to one reel 20. As those skilled in the art will appreciate, the gaming device 10 may include additional stepper motors 30. Alternatively, in another embodiment, the gaming machine 10 may have fewer stepper motors 30 than reels 20. The gaming device 10 also includes a reel control unit (RCU) 28, and a game controller 32.

As shown in FIG. 2, the reels 20 are operatively coupled to stepper motors 30. The stepper motors 30 are responsible for spinning and stopping the reels 20. Once the reels 20 stop, multiple symbols 22 are visible. Each reel spin is comprised of a specific number of motor steps having a fixed time duration that operates the motor to achieve a fixed angle of rotation. During acceleration of the reels 20, the motor steps generally progress from a long duration to a short duration. When the reels 20 are traveling at their final velocity, all the motor steps are of the same duration. During deceleration, the motor steps generally progress from a short duration to a long duration until the motor comes to a stop.

The stepper motors 30 of the gaming machine 10 are controlled and monitored by the RCU 28. More specifically, the RCU 28 is responsible for determining the spin profile for each reel 20. In order to determine the appropriate spin profile, the RCU 28 calculates the distance between the current and final position of each reel. Based upon the spin distance and the desired spin duration of each reel, the RCU 28 then determines a spin profile for each reel 20.

As shown in FIG. 2, the RCU 28 is in communication with the game controller 32. The game controller 32 is a combination of hardware and software components that supports the game for a gaming machine or a group of gaming machines 10. The game controller 32 is configured to support the game and may be responsible for the various functions of the gaming machine, such as, but not limited to, monitoring coin-in, coin-out, or credit meters, and awarding any prize(s) based upon the game result. The game controller 32 also generates the game outcome (i.e., the final stopping position for each reel) and is responsible for determining the desired spin duration for each reel 20. As those skilled in the art will appreciate, any of these functions may be separated into different or logical units and do not have to exist in a single controller unit. The RCU 28 also responsible for timing the illumination of the symbols with the reel position.

In one embodiment, the game controller 32 includes a random number generator 34 that determines a game outcome, wherein the game outcome is a combination of indicia. In alternate embodiments, the game controller 32 may use a pseudo-random number generator or a weighted random number generator to determine the game outcome. In yet another embodiment, the random number generator 34 (or pseudo-random number generator or weighted random number generator) is a separate component in communication with the game controller 32.

As shown in FIG. 2, the RCU 28 and the game controller 32 are separate components located within the gaming machine 10. As those skilled in the art will appreciate, the RCU 28 may be interconnected to the game controller 32 by a USB connection, a wireless network connection, or any other means for operatively coupling components together. In an alternate embodiment, the RCU 28 and the game controller 32 are integral components (not shown). In yet another embodiment, the RCU 28 and the game controller 32 may be located within the gaming machine 10, but the functions of the RCU or the game controller may be carried out at a central location (not shown), such as a network server, and communicated to each gaming machine by a local area network, wireless network, wide area network, or the like.

Figure 3:
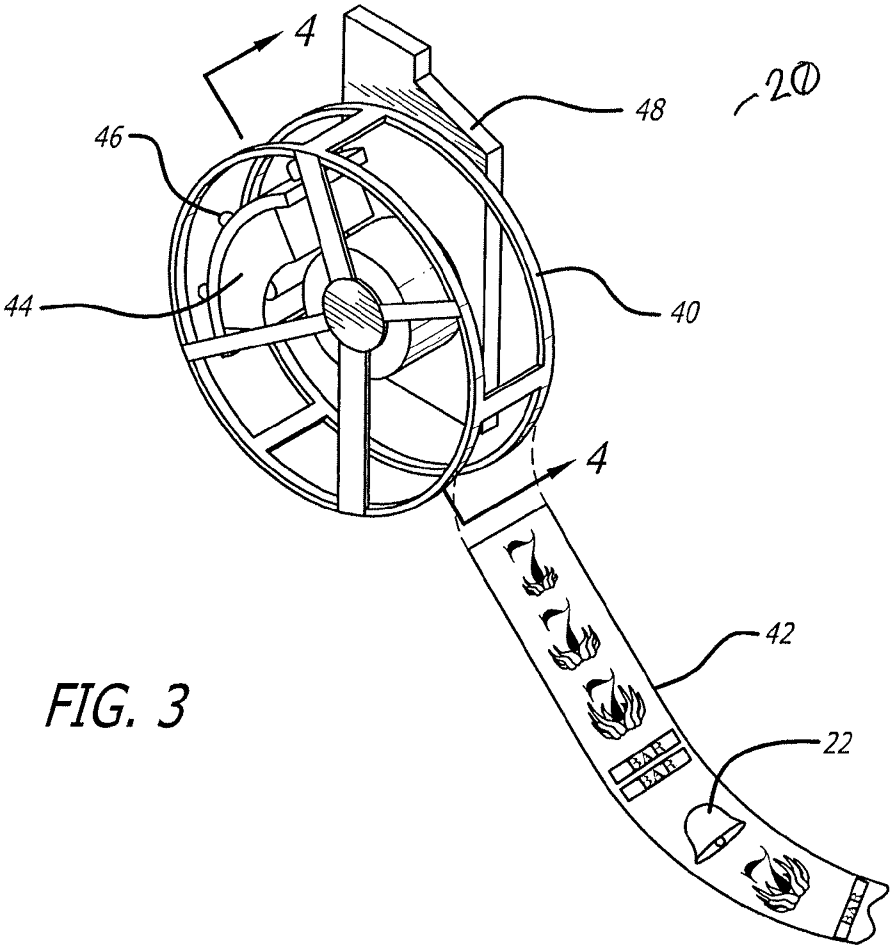
FIG. 3 is a perspective view of a reel basket.
Figure 4:
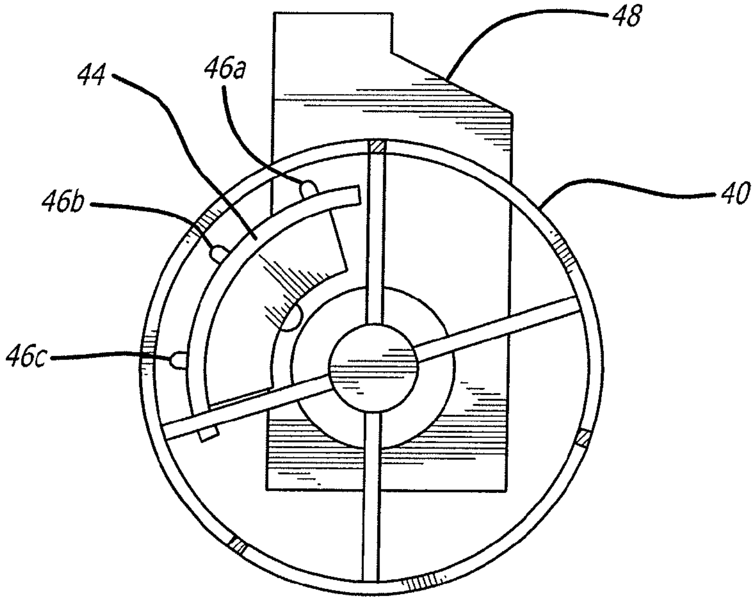
FIG. 4 is a side view of one embodiment of a reel basket.
Figure 5:
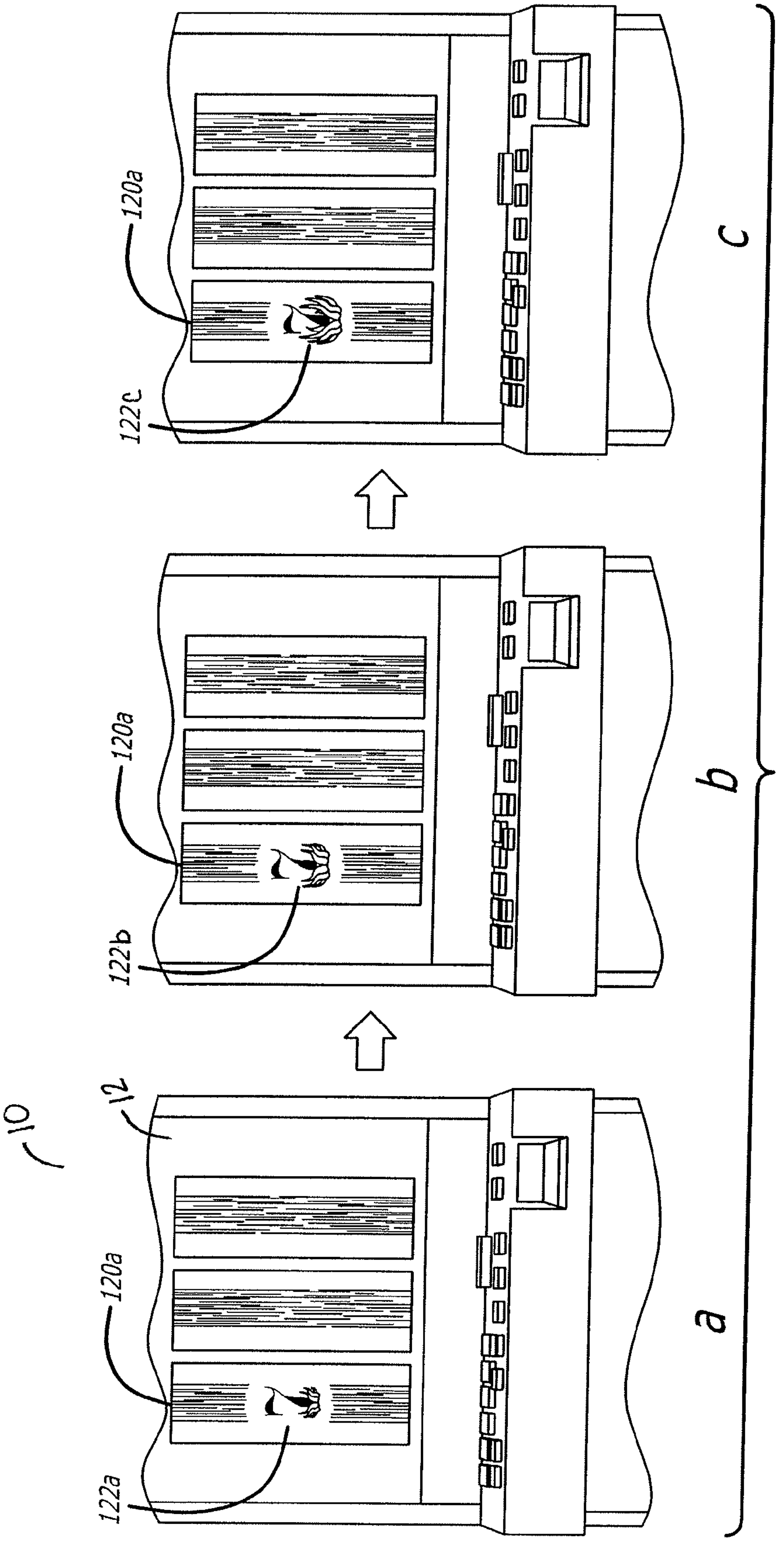
FIG. 5 illustrates one example embodiment of an animation sequence.

Referring to FIG. 3 a reel 20 is shown. The reel 20 includes a basket 40 which is a support structure. A reel strip 42 having multiple symbols 22 thereon may be applied or mounted around the circumferential surface of the basket 40. A light system 44 is located within the basket 40. Referring to FIG. 4, in one embodiment the light system 44 comprises three light sources 46*a*, 46*b* and 46*c*. Those skilled in the art will appreciate the light system 44 may include white light, color light, black light, and any combination thereof. In an alternate embodiment, the light system 44 includes only one light source 46. Optionally, in another embodiment, the lighting system may include any number of light sources 46. The reel 20 also includes a bracket 48 for mounting the reel within the gaming machine 10.

Examples of light sources 46 used in the light system 44 may include, but are not limited to, incandescent light bulbs, light-emitting diodes (LEDs), organic light-emitting diodes (OLEDs), neon lighting, lasers, and any other known light sources.

In an alternate embodiment, the light system 44 includes one light source 46 (not shown). The single light 44 is mounted on a pivotable mechanism that enables the lighting system to rotate and move as need in order to properly illuminate symbols on the reels strip 42.

In one embodiment, the reels strip 42 contains twenty-one symbols. In another embodiment, the reel strip contains twenty-one symbols for game play and an additional number of symbols in "invisible" ink. The symbols printed in invisible ink are intended for use in the animation sequences. Ultraviolet light (also called black light) is then used to illuminate the symbol printed in invisible ink and make the symbol at least temporarily visible.

In one example embodiment, during operation of the gaming machine 10, the player places a bet by entering a bet amount or wager amount. The gaming machine generates at least one random event and an award is provided to the player if a winning outcome occurs as a result of the random event. In the mechanical slot machine 10, the reels are rotated and stopped to place the symbols on the reels in visual association with a payline. While the reels are rotating, or spinning, an animation effect is presented to the player. In one embodiment, the animation is presented on one particular reel 120. For example, referring to FIG. 5, in one example embodiment the animated sequence is presented on a reel 120*a*. As the reel 120*a* spins, a first symbol 122*a* located on reel 20*a* is briefly illuminated. The brief illumination of the first symbol 122*a* creates a stopped motion effect. Next, a second symbol 122*b*, located on the reel 120*a* is briefly illuminated. The symbol 122*b* is slightly different from symbol 122*a*. More particularly, symbol 122*b* has larger flames than symbol 122*a*. While reel 122*a* is still spinning, a third symbol 122*c* is then briefly illuminated. Symbol 122*c* differs slightly from FIGS. 122*a* and 122*b* in that symbol 122*c* appears to have larger flames than either 122*a* and 122*b*. The culmination of briefly illuminating each of symbols 122*a*, 122*b* and 122*c* on spinning reel 120*a* creates an animation effect. In other words, the effect of illuminating the symbols 122*a*, 122*b* and 122*c* in the manner described above is the make the fire in the symbols appear to grow.

Figure 6:
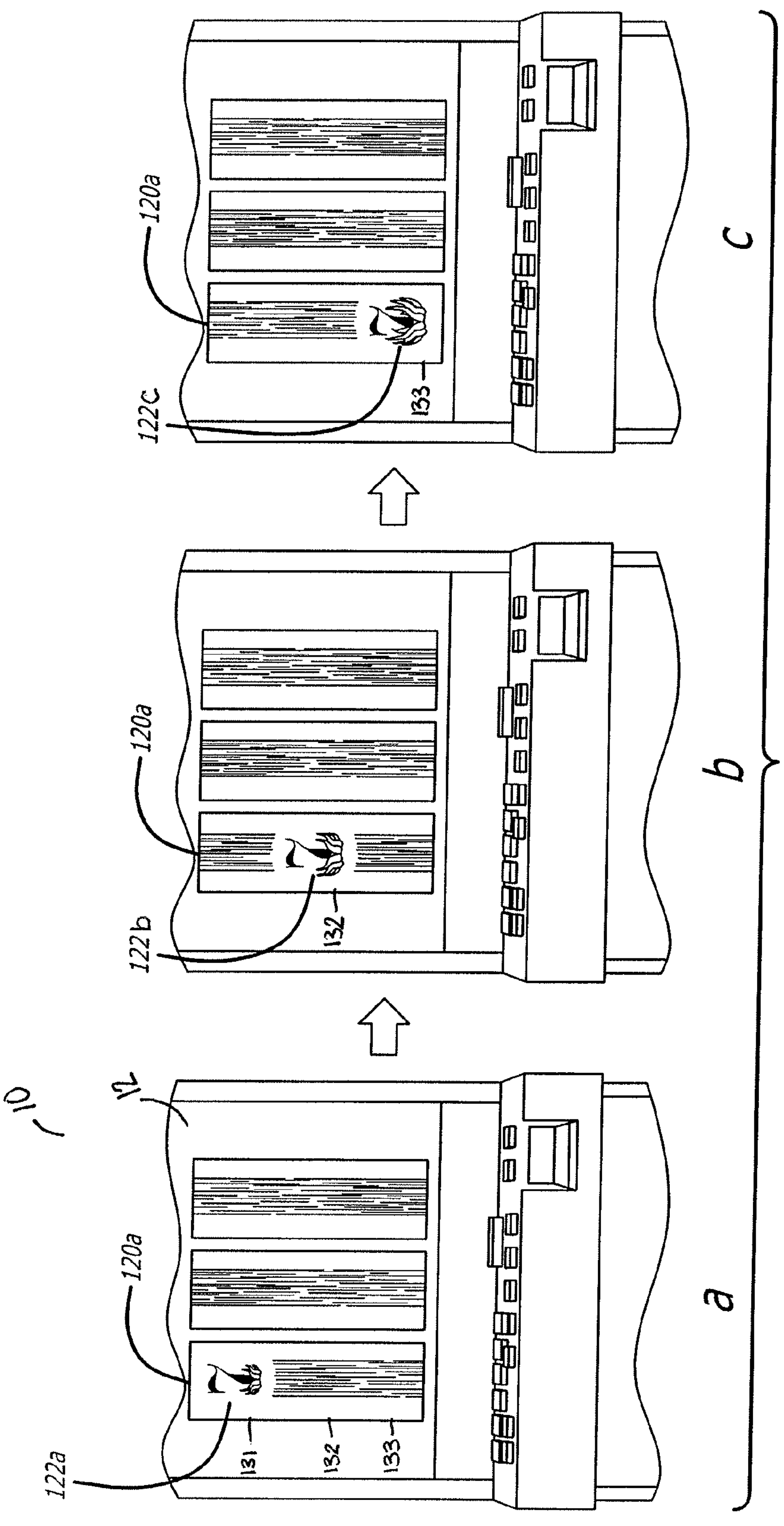
FIG. 6 illustrates another example embodiment of an animation sequence.
Figure 7:
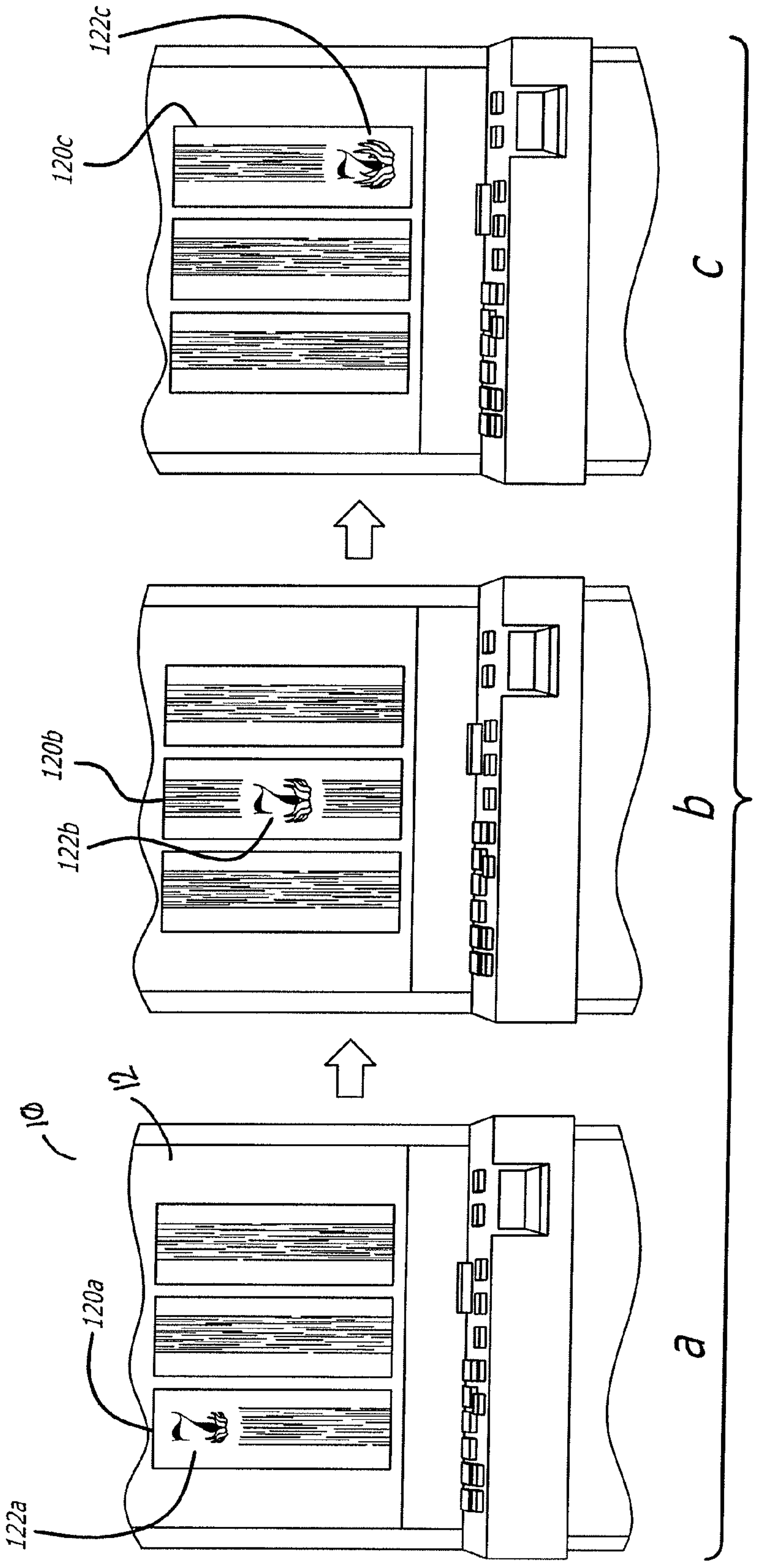
FIG. 7 illustrates another example embodiment of an animation sequence.
Figure 8:
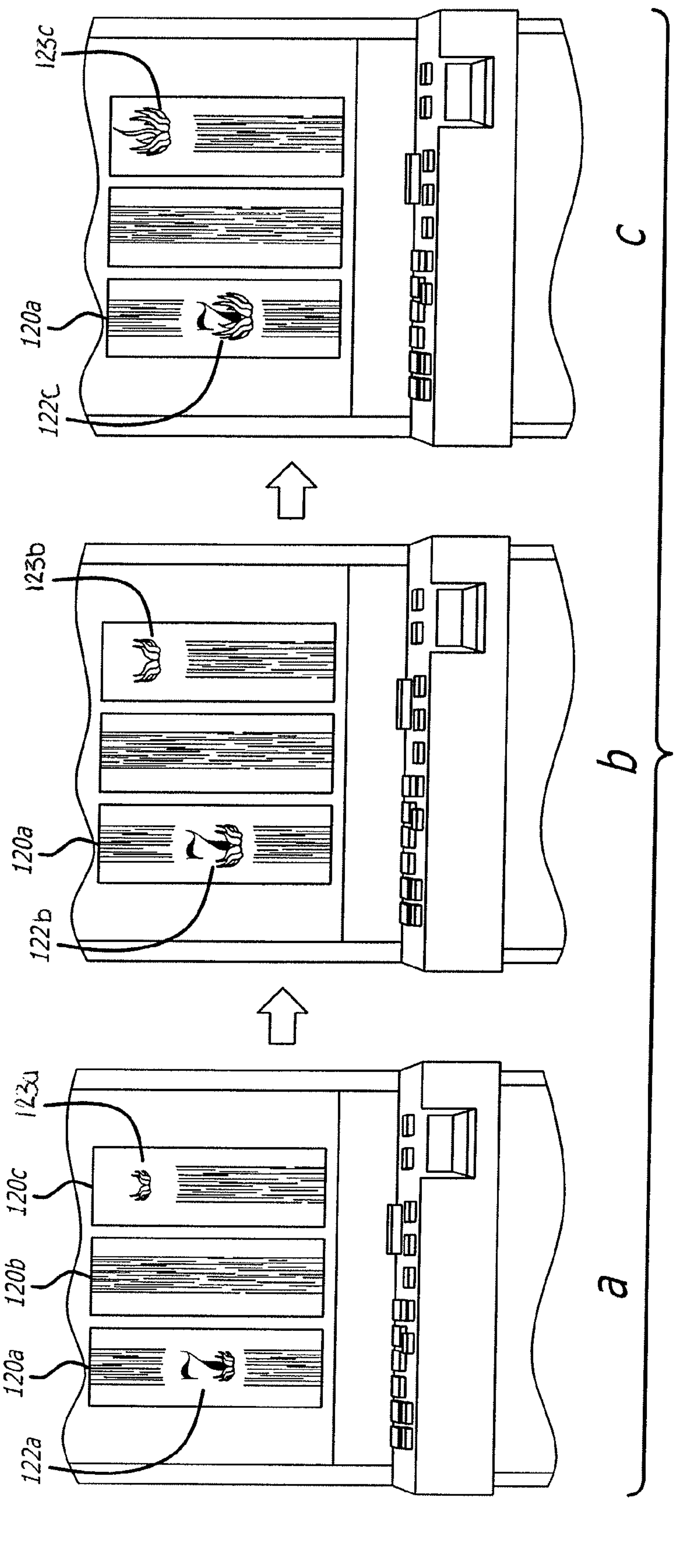
FIG. 8 illustrates another example embodiment of an animation sequence.

In another embodiment the animation sequence may be presented on one reel, but on multiple positions on the reel. Referring now to FIG. 6, various illustrations of the display window 12 are shown. During operation of the game machine, at least one of the reels 120 are rotated. In the example embodiment illustrated in FIG. 6, as reel 120*a* is rotated, a first symbol 122*a* is briefly illuminated while the symbol is positioned in the top display position 131. In the next step of the animation sequence, a second symbol 122*b* on reel 120*a* is briefly illuminated while reel 120*a* spins. Symbol 122*b* is illuminated when the symbol is positioned in the middle display position 132. In a third step of the animation sequence, a symbol 122*c* on reel 120*a* is briefly illuminated as the reel 120 spins. Symbol 122*c* is illuminated when the symbol is positioned in the bottom display position 133. In this example, the animation sequence produces the effect of a symbol having a fire that grows, in addition to the animation moves positions on the screen (i.e., the animations goes from top to middle to bottom). Those skilled in the art will appreciate the animation sequence may include additional symbols In another example embodiment the animation sequence is displayed on more than one reel. Referring now to FIG. 7, various illustrations of the display window 12 of a gaming machine 10 are shown. During operation of the game, a first symbol 122*a* on reel 120*a* is briefly illuminated while reel 120 is spinning. In the next step of the animation sequence, a symbol 122*b* on the reel 120*b* is illuminated while the reel 120*b* is spinning. In a third step of the animation sequence, a symbol 122*c* on the reel 120*c* is briefly illuminated while the reel 120*c* is spinning. In FIG. 6, the symbols 122*a*, 122*b* and 122 *c* are illuminated at different positions on the reel. More particularly, symbol 122*a* is illuminated when it is positioned in the top display position 131. Symbol 122*b* is illuminated when it is positioned in the middle display position 132. Symbol 122*c* is illuminated when it is positioned in the bottom display position.

In an alternate embodiment, the animation sequence may occur on more than one reel as illustrated in FIG. 6, but the illumination of the symbols may occur at the same position (not shown).

In another example embodiment, the animation sequence includes the presentation of multiple icons on multiple reels. Referring back to FIG. 7, various illustrations of the display window 12 of a gaming machine 10 are shown. During operation of the gaming machine reels 120*a*, 120*b* and 120*c* are spinning. In the first step of the animation sequence, a symbol 122*a* on spinning reel 120*a* is briefly illuminated and a symbol 123*a* on spinning reel 120*c* is briefly illuminated. In the next step of the animation sequence, a symbol 122*b* on spinning reel 120*a* is briefly illuminated and a symbol 123*b* on spinning reel 120*c* is briefly illuminated. In the next step, a symbol 122*c* on spinning reel 120*a* is briefly illuminated and a symbol 123*c* on spinning reel 120*c* is briefly illuminated.

In an alternate embodiment, the animation sequence includes presenting an animation on each of the reels (not shown). Alternately, in another embodiment, the animation sequence includes displaying an animation on each of the three positions on the reel (e.g., the top, middle and bottom display positions). Those skilled in the art will appreciate any number of steps may be included in the animation sequence, as well as any combination of symbols and positions on the display window 12.

In an optional embodiment, a casino gaming system provides animation to multiple gaming machines. More particular, the back end server may serve as the control for determining when to trigger the display of animation on one or more gaming machines 10. In one example embodiment, the casino gaming system employs a player tracking system. The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on the gaming machine 10. These input components include, but are not limited to, a card reader for receiving a player tracking card, a keypad or equivalent, an electronic button receptor, a touch screen and the like. The player tracking system may also include a database of all qualified players (i.e., those players who have enrolled in a player rating or point accruing program). Generally, the database for the player tracking system is separate from the gaming devices.

As noted above, each gaming machine 10 includes a card reader 26 that may be used to read player tracking cards. In one embodiment, the card reader 26 receives player information and the received information affects the animation. For example, the system may be configured to trigger animation only for players who have a player tracking card. If a player does not insert a player tracking card into the card reader 26 then no animation will be presented to the player. Optionally, in an alternate example, the animation may be presented to players only on special occasions such as birthdays and anniversaries. This information would be obtained from the player tracking card. Further, player activity could be criteria for triggering the animation. In one example, the animation may be presented only for high rollers. Again this information would be obtained from the player history.

Optionally, in alternate embodiments, other actions for triggering animation may include, but are not limited to, a particular number of consecutive wins, a maximum number of bets, time of play, frequency of play (i.e., number of games played in a particular period of time), number of player points earned, a particular time (of day, month, or year), the detection of a particular player, and the like. Additionally, more than one of the above-described actions may be designated as a trigger. Alternately, any combination of the above-described action may be designated as a trigger.

In an optional embodiment, multiple gaming machines are configured to present animation on the display window 12 during the spinning of the reels 20 at the same time. The animation could be synchronized across a bank of gaming machines 10 so that the animated symbol appears to move across the gaming machines 10.

One of ordinary skill in the art will appreciate that not all gaming machines 10 will have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A method for providing animation on a gaming machine having one or more mechanical reels, comprising:

spinning at least one mechanical reel, wherein the mechanical reel comprises symbols located at a plurality of symbol positions around an outer circumference of the mechanical reel;

selecting an animation sequence to present during the spinning of the mechanical reel, the animation sequence comprising at least a first symbol and a second symbol;

illuminating the first symbol of the animation sequence, wherein the first symbol is located on the spinning mechanical reel and a lighting system directs light onto the first symbol for a designated amount of time while the mechanical reel is spinning;

illuminating the second symbol in the animation sequence, wherein the second symbol is located on the spinning mechanical reel and the lighting system directs light onto the second symbol for a designated amount of time while the mechanical reel is spinning, and wherein a combined effect of illuminating the first and second symbols while the mechanical reel is spinning is to produce an appearance of movement or motion across multiple symbol positions on the mechanical reel.

2. The method of claim 1, further comprising illuminating one or more additional symbols on at least one mechanical reel, wherein each additional symbol is illuminated for a designated amount of time while the mechanical reel is spinning.

3. The method of claim 1, further comprising illuminating one or more additional symbols on at least one additional mechanical reel, wherein each additional symbol is illuminated for a designated amount of time while the mechanical reel is spinning.

4. The method of claim 1, further comprising receiving player input to stop the animation.

5. The method of claim 1, further comprising receiving information from a player tracking card, and the received information determining the criteria for presenting animation to a player.

6. The method of claim 1, further comprising receiving information from a casino server via a network connection, the received information determining the criteria for the presented animation.

7. The method of claim 1, further comprising receiving a trigger to begin the animation.

8. A method for providing animation on a network of gaming machines, the method comprising:

providing two or more gaming machines connected via a network connection;

spinning at least one mechanical reel on a first gaming machine, wherein the mechanical reel comprises one or more symbols around an outer circumference of the mechanical reel;

illuminating a first symbol located on the spinning mechanical reel of the first gaming machine, wherein a lighting system directs light onto the first symbol for a designated amount of time while the mechanical reel is spinning;

spinning at least one mechanical reel on a second gaming machine, wherein the mechanical reel comprises one or more symbols around an outer circumference of the mechanical reel; and illuminating a second symbol located on the spinning mechanical reel of the second gaming machine that is graphically related to the first symbol, wherein a lighting system directs light onto the second symbol for a designated amount of time while the mechanical reel is spinning, and wherein a combined effect of illuminating the first and second graphically related symbols while the mechanical reels are spinning is to produce an appearance of animation.

9. The method of claim 8, further comprising illuminating one or more additional symbols on at least one of the mechanical reels, wherein each additional symbol is illuminated for a designated amount of time while the mechanical reel is spinning.

10. The method of claim 8, further comprising receiving information from a player tracking card, wherein the received information includes information to trigger the presentation of animation to a player.

11. The method of claim 8, further comprising receiving information from a casino server via a network connection, the received information determining the criteria for the presented animation.

12. The method of claim 8, wherein each additional symbol is illuminated for a designated amount of time while the mechanical reel is spinning.

13. The method of claim 8, further comprising receiving a trigger to begin the animation.

14. A method for providing animation on a gaming machine having one or more mechanical reels, comprising:

spinning one or more mechanical reels having one or more symbols;

selecting an animation sequence to present during the spinning of the one or more mechanical reels, the animation sequence comprising at least a first symbol and a second symbol that are graphically related and that are associated with one or more reels;

illuminating the first symbol for a designated amount of time while the first symbol is in motion;

illuminating the second symbol for a designated amount of time while the second symbol is in motion, wherein a combined effect of illuminating the graphically related first and second symbols while the first and second symbols are in motion produces an appearance of animation because the first and second symbols are graphically related.

15. The method of claim 14, wherein the appearance of animation includes illuminating the first and second symbols on a first reel such that the animation sequence is perceived as occurring at a single position on the first reel while the first reel is spinning.

16. The method of claim 14, wherein the appearance of animation includes movement or motion across multiple positions on one mechanical reel.

17. The method of claim 14, wherein the appearance of animation includes movement or motion across multiple mechanical reels.

* * * * *